United States Patent [19]

Burke

[11] Patent Number: 4,855,906
[45] Date of Patent: Aug. 8, 1989

[54] SYSTEM FOR HANDLING UNSOLICITED MESSAGES FROM LOWER-TIER CONTROLLERS

[75] Inventor: Thomas J. Burke, Chagrin Falls, Ohio

[73] Assignee: Allen-Bradley Company, Inc., Milwaukee, Wis.

[21] Appl. No.: 113,216

[22] Filed: Oct. 23, 1987

[51] Int. Cl.⁴ .................. G06F 15/46; G06F 13/00
[52] U.S. Cl. .................. 364/200; 364/222.82; 364/229.41; 364/260.1; 364/242.5; 364/241; 364/138; 340/870.16
[58] Field of Search ... 364/200 MS File, 900 MS File, 364/132, 137, 138; 340/825.05, 825.36, 870.16

[56] References Cited

U.S. PATENT DOCUMENTS

| | | | |
|---|---|---|---|
| 4,275,382 | 1/1981 | Jannotta | 364/509 X |
| 4,319,338 | 3/1982 | Grudowski et al. | 364/900 |
| 4,635,189 | 1/1987 | Kendall | 364/200 |
| 4,652,998 | 3/1987 | Koza et al. | 364/900 X |
| 4,704,717 | 11/1987 | King, Jr. | 370/9 X |
| 4,714,995 | 12/1987 | Materna et al. | 364/200 |
| 4,718,005 | 1/1988 | Feigenbaum et al. | 364/200 |
| 4,730,183 | 3/1988 | Crowe | 340/870.16 |
| 4,737,783 | 4/1988 | Tanaka et al. | 340/825.08 |
| 4,777,488 | 10/1988 | Carlman, Jr. et al. | 340/825.08 |

OTHER PUBLICATIONS

Allen-Bradley Bulletin 1771-6.5.15 (1985) Chapters 2 & 5.

Primary Examiner—Archie E. Williams, Jr.
Assistant Examiner—Thomas Lee
Attorney, Agent, or Firm—Quarles & Brady

[57] ABSTRACT

In a multi-tier computer system, a database configuration message is transmitted from a cell controlling computer to a database cache computer to designate certain data items to be monitored at one or more station-level computers. The database cache computer is connected via a local area network to the station-level computers. The station-level computers monitor the data items and generate unsolicited messages containing changed states for data items which have changed over the monitoring period. The database cache computer receives the unsolicited message and interprets the data therein to update the relevant data items. The unsolicited messages are sent back periodically without the need for polling by the database cache computer. If desired, the data in the unsolicited messages can be limited to data which has changed since the last update of the relevant data items.

5 Claims, 10 Drawing Sheets

SYSTEM FOR HANDLING UNSOLICITED MESSAGES FROM LOWER-TIER CONTROLLERS

BACKGROUND OF THE INVENTION

1. Field of the Invention

The field of the invention is computer equipment for linking a plurality of machine or process controllers in a factory automation network.

2. Description of the Background Art

In factory automation, more complex functions could be performed and coordinated if the programmable or computerized machines presently used to control mechanical equipment could be connected in a network with each other and with higher-level supervisory computers. Current factory automation plans call for at least two levels of supervisory computers for controlling and coordinating the work of programmable controllers. At a lower level, computers known as cell controlling computers or cell controllers monitor and coordinate actions of a number of station-level computers, such as programmable controllers, numerical controllers, motor drive systems, robot controllers and machine vision systems. At a higher level the cell controlling computers communicate with factory-level computers.

The connection of computers in a factory automation system requires improved networking capabilities. In Miller et al., U.S. application Ser. No. 928,529, filed Nov. 7, 1986, an entire database is downloaded from a cell controlling computer to an access machine to provide a remote data cache interface between the cell controlling computer and a group of station-level computers. The access machine reduces message traffic for efficient and fast response of the computer hierarchy to conditions occurring on the factory floor.

The cell controlling computer may execute various application programs which require data from widely distributed, individual stations. The access machine collects data from the station-level devices on the factory floor. The cell controlling computer is tied to the access machine through a data access link. One database operation message transmitted over the data access link may contain data from a number of programmable machines located at various stations along an assembly line. Thus, the cell controlling computer is relieved of a great deal of data collection activity, and this allows for greater speed in execution of its application programs and user interface functions.

The relocation of the database to the access machine allows for a reduction of message traffic to the cell controlling computer. However, the problem of communicating with many stations still exists on the downstream side of the access machine where communication with the stations is handled through local area networks.

Perhaps the most common method of communication in hierarchical computer systems is the polling method in which a higher-level computer sends a "polling" or "request for data" message to a lower-level computer and receives a message in response to the polling message that contains the requested data. It had been considered that a first pair of messages was required to "initialize" the communication with a station, before additional messages could be sent to effect data collection.

To improve performance in multi-tier, hierarchical computer systems, communication must be improved by departing from certain assumptions that have governed communication in earlier systems.

SUMMARY OF THE INVENTION

The invention is related to a database cache computer for connection in a factory automation cell that includes a cell controlling computer and one or more station-level computers located at a corresponding plurality of stations.

The database cache computer communicates with the station-level computers via messages which include blocks of information that are organized according to the method of addressing used at the station level by the station-level computers.

The database cache computer stores a database in which data items associated with respective station-level computers are organized for access by the cell controlling computer on a basis that is independent of the addresses which are assigned to the data items at the stations for reference by the respective station-level computers.

Because the database cache computer provides access to a database of data collected from the various stations, it is also referred to as a "database access machine" or more simply as an "access machine".

The invention provides a data collection mechanism for receiving and interpreting data update messages from station-level computers without prompting the station-level computer with a polling message. Prior to the invention, the data collection method required a "polling" or "request" message from the access machine to the station-level computer.

Now, when the station-level computer detects a change in a value of a designated data item, it generates an "unsolicited" message to the database cache computer. By "unsolicited" it is meant that a polling message is not required to prompt the return of the message with the new data.

The invention reduces message traffic on the networks connecting the station-level computers to the database cache computer. Message traffic may be limited to messages with data that has changed since the last message from a particular station. Unsolicited messages may also be received and interpreted during periods when polling messages are being sent and polling response messages are being received.

In a further aspect of the invention the monitoring period is based on a time period or the occurrence of a change in the state of a data item during the monitoring period, whichever occurs first.

Other objects and advantages besides those discussed above shall be apparent to those familiar with the art from the description of a preferred embodiment of the invention which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENT

Figure 1:
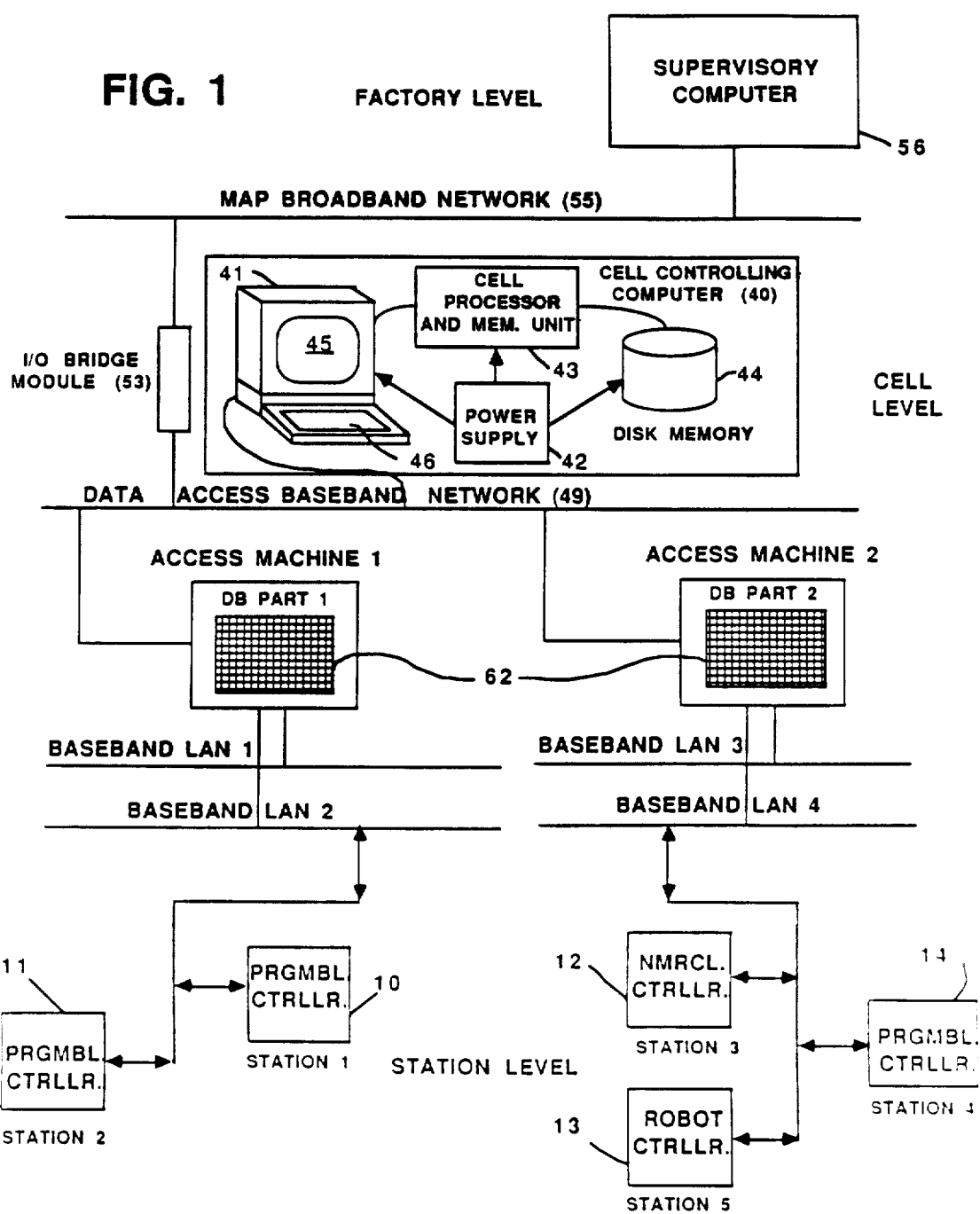
FIG. 1 is a block diagram showing the management of data items in a factory cell automation system that incorporates an access machine of the present invention.

The invention is incorporated as an enhancement to a method and apparatus first disclosed in Miller et al., U.S. Ser. No. 928,529, filed Nov. 7, 1986. That document describes a hierarchical, multi-tier computer system of the type shown in FIG. 1. Such a system includes one or more station-level computers such as programmable controllers 10, 11, and 14, numerical controller 12 and robot controller 13. All of these station-level computers control machines and other electromechanical devices. Although not shown, station-level computers such as graphics interface stations and machine vision systems could also be connected as station-level computers. Thus, some station-level computers would be machine controlling computers and others would exchange data with higher-level computers for other purposes.

The station-level computers communicate with a cell controlling computer 40 through one or more database access machines referred to as ACCESS MACHINE 1 and ACCESS MACHINE 2. The station-level computers are typically located at "remote" stations throughout a factory. By "remote" it is meant that the stations are usually at least 50 feet or more away from any higher-level computer, and that the networks connecting the stations to higher-level computers use serial data communication rather than parallel data communication.

The cell controlling computer 40 is a computer for supervising, monitoring and coordinating the activities of the station-level computers. It is also a computer with a user interface including a video monitor and keyboard by a which a human operator can direct and verify certain operations of the cell control system. The access machine computers are "cache" computers for storing a database that interfaces the cell controller-access machine communication link to networks of station-level computers. The cell controlling computer 40 may also be connected for communication to a factory-level supervisory computer 56 through an I/O bridge module 53, and this supervisory computer 56 may be of the mainframe or minicomputer class.

The cell controlling computer 40 includes a work station 41, a power supply unit 42, a cell processor and memory unit 43 and a hard disk memory unit 44. These units 41–44 are housed in separate enclosures. The control center or brain of the cell computer system is the cell processor and memory unit 43. This unit 43 contains processor and memory modules. Within the processor module is a microelectronic CPU from the 68000 Series of CPU's manufactured by Motorola, Inc. of Phoenix, Ariz., and Austin, Tex. The memory modules include random access memory (RAM) circuits with eight megabytes (8 Mb) of storage capacity. The work station 41 and the hard disk memory unit 44 are peripherals connected to the cell processor and memory unit 43. The power supply unit 42 provides power to the other units in the system. The work station 41 includes a color video monitor 45 and a separate keyboard 46 and mouse (not shown). The hard disk memory unit 44 provides seventy-one megabytes (71 Mb) of storage capacity and is useful for saving application programs, databases and other data files and reloading these items into the 8-megabyte RAM on startup.

The cell controlling computer 40 is compatible with the Series 5400 Computer Systems available from Massachusetts Computer Corporation, Westford, Mass. It runs under the UNIX operating system available from AT&T Bell Laboratories, Short Hills, N.J.

The cell controlling computer 40 is connected through a data access baseband network 49 to ACCESS MACHINE 1 and ACCESS MACHINE 2. The baseband network 49 is a carrier sense multiple access/collision detection (CSMA/CD) type as specified in IEEE Std. 802.3. The network 49 is connected through an I/O bridge module 53 to a broadband network 55 conforming to the MAP protocol as specified to date and conforming to IEEE Std. 802.4 for a token-passing bus network. Through the MAP network 55, the cell controlling computer is connected to the factory level supervisory computer 56.

An analogy can be drawn between the access machines and a large group of pigeonholes such as those used in an old post office. Station-level computers insert and retrieve information (data, messages, graphic images) from one side of the pigeonholes on a schedule determined by the needs of machines or processes being controlled. The cell controlling computer 40 inserts and retrieves information from the other side of the pigeonholes on a different schedule determined by the needs of the human interfaces and higher-level computers connected through the cell controlling computer 40. Each pigeonhole represents an item that is assigned its own unique location in the database.

The access machines allow the system database to be distributed outside of the cell controlling computer 40 and will also be referred to herein as database "cache" computers. The cell controlling computer 40 handles communications with the user through the work station 41, which includes the video monitor 45, the keyboard 46 and the mouse (not shown), while the access machines handle data collection from the remote stations.

A system database 62 is stored in the disk memory 44 of the cell controlling computer 40 and upon startup, is downloaded to ACCESS MACHINE 1. In this example, the system database 62 is distributed to two access machines, so that PART 1 of the system database 62 is downloaded and stored in ACCESS MACHINE 1 and PART 2 of the system database 62 is downloaded and stored in ACCESS MACHINE 2.

The station-level computers 10, 11 and 14 are connected to ACCESS MACHINE 1 and ACCESS MA- CHINE 2 through baseband local area networks (LAN's), referred to as BASEBAND LAN 2 and BASEBAND LAN 4 in the drawing. The preferred networks are offered under the trade designation Data Highway TM by Allen-Bradley Company, Inc. of Highland Heights, Ohio.

Although not shown in the drawings it will be understood by those familiar with the art that network interface modules are included in the station-level computers. For a description of the construction and operation of these networks and network interface modules, reference is made to Grudowski et al., U.S. Pat. No. 4,319,338, issued Mar. 9, 1982, and commercial literature available from Allen-Bradley Company, Inc. on the Data Highway TM networks and network interface modules, including in particular, Bulletin 17716.5.15 (1985).

During startup operations, the database 62 is downloaded in parts from the cell controlling computer 40 to ACCESS MACHINE 1 and ACCESS MACHINE 2. To update data in the database, new values must be collected from the various station-level computers. To accomplish this, network messages are transmitted over the BASEBAND LAN's to and from the station-level computers. These messages correspond one-to-one with a particular station, e.g., if there are three stations, there are three pairs of network messages, one pair corresponding to each station.

In the database 62, data are stored in data records, which are identified by tags. Items within the data records are referred to as "atoms" and are identified by an atom reference appended to a tag. Data originating at various station-level computers can be loaded into a single database operations messages and transmitted over the data access baseband network 49. This relieves the cell controlling computer 40 of much of the activity involved in data collection, so that it can perform user interface functions more quickly and efficiently.

Figure 2:
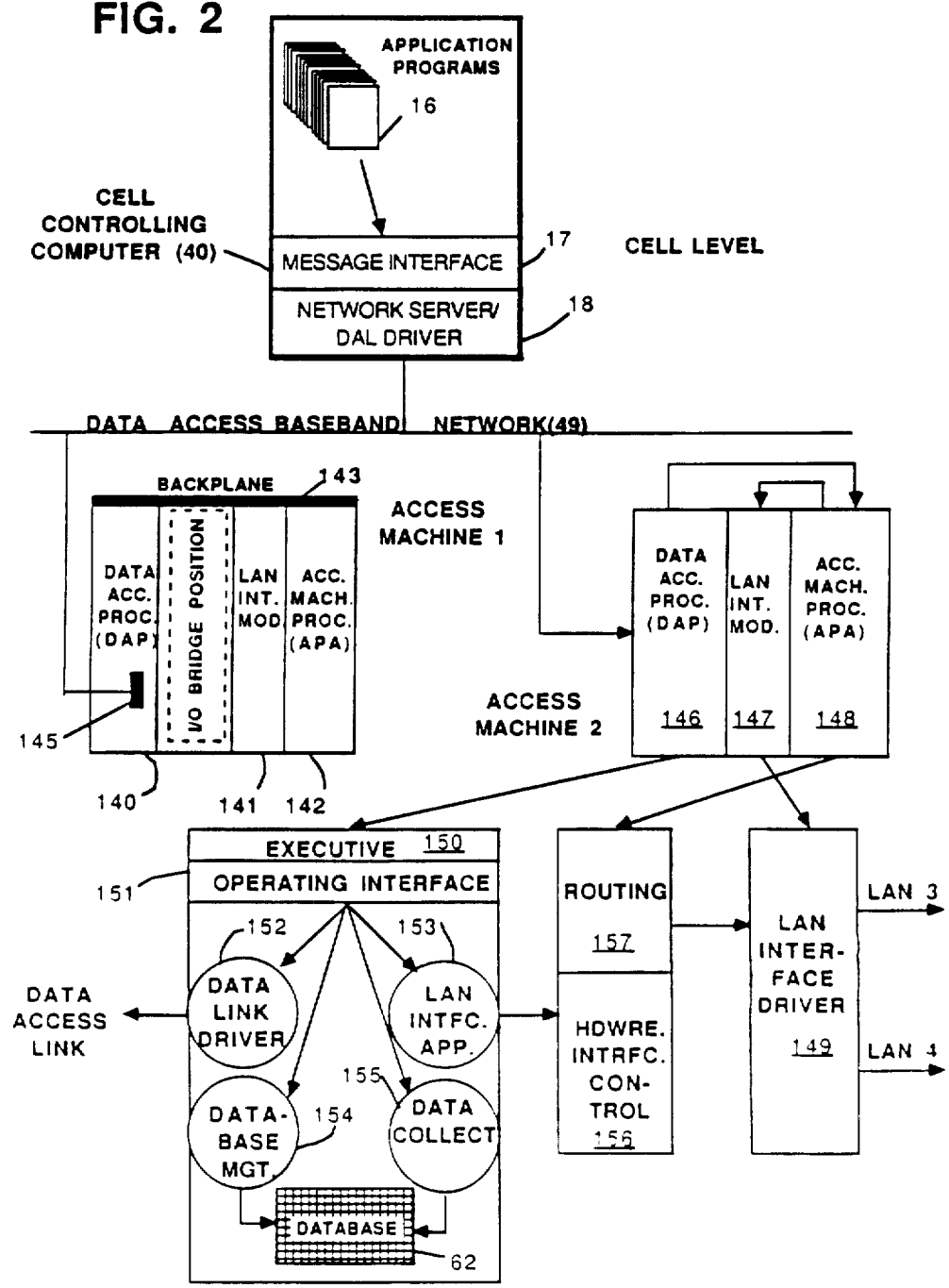
FIG. 2 is a hardware-firmware schematic showing the architecture of the cell controlling computer and the access machine of FIG. 1.

FIG. 2 shows that one or more application programs 16 are designed by a user of the cell controlling computer 40 to communicate with the database 62 that resides in the access machines. To communicate with the database 62 after it has been downloaded, the application programs 16 send software messages through a message interface module 17 to a network server module 18. The network server module 18 calls a data access link (DAL) driver subroutine to convert software messages to the protocol necessary to transmit the messages across the data access baseband network 49. For further details concerning this aspect of the cell controller 40, reference is made to U.S. application Ser. No. 928,529 filed Nov. 7, 1986.

As seen in FIG. 2, ACCESS MACHINE 1 has four circuit modules which are supported in an equipment rack (not shown). The equipment rack includes a backplane motherboard 143 with electrical connectors that receive mating connectors on three modules, a data access processor (DAP) module 140, a local area network (LAN) interface module 141 and an access machine processor (APA) module 142. The DAP module 140 has a connector 145 on its front side that connects to the data access baseband network 49. The other module in the rack is the I/O bridge module 53, which is supported in the rack in the position outlined in phantom, but which is not connected to the backplane 143.

ACCESS MACHINE 2 also has a DAP module 146, an LAN interface module 147 and an APA module 148 which are identical to the modules 140-142 in ACCESS MACHINE 1. A second I/O bridge module 53 is not needed for ACCESS MACHINE 2.

FIG. 2 also shows the organization of the programs in the modules 146-148 of ACCESS MACHINE 2, and this is the same for ACCESS MACHINE 1. The DAP module 146 includes a microelectronic CPU from the 68000 Series available from Motorola, Inc. of Phoenix, Ariz. and Austin, Tex. This component is the central controlling element or brain of the DAP module 146. The highest level program component is a multi-tasking executive program 150 and a number of these are available from commercial sources for the various models of microelectronic CPU's. The particular one used in this embodiment is available under the trade designation C-EXEC from JMI Software Consultants, Spring House, Pa.

The executive program 150 is interfaced to four other program modules 152-155 through an operating interface module 151. The first two modules 152, 153 perform the communication tasks to be described, while the second two modules 154, 155 execute tasks for collecting, managing and accessing data in the database 62.

The DAP module 146 includes a 2-megabyte dynamic RAM which receives and stores the database 62 and program modules 150-155 which are downloaded from the cell controlling computer 40 on startup. The speed of the access machines is maximized by executing programs and operating on data in RAM memory.

The data link driver module 152 provides instructions for handling communication of messages over the data access baseband network 49. The LAN interface application module 153 communicates message information that is transmitted over the BASEBAND LAN 1-4 networks, but first the information is transmitted through the APA module 148 and the LAN interface module 147. The BASEBAND LAN 3-4 networks connect to the LAN interface module 147. The APA hardware module 148 includes firmware in the form of a hardware interface control module 156 and a routing module 157 for routing messages to stations on the two networks connected to the LAN interface module 147. The LAN interface module 147 is organized along two parallel data paths, one for each BASEBAND LAN, and includes LAN interface driver firmware 149. For further details of the construction of the access machine modules and transmission of messages between the access machine and the cell controlling computer 40, reference is made to U.S. application Ser. No. 928,529 filed Nov. 7, 1986.

Figure 3:
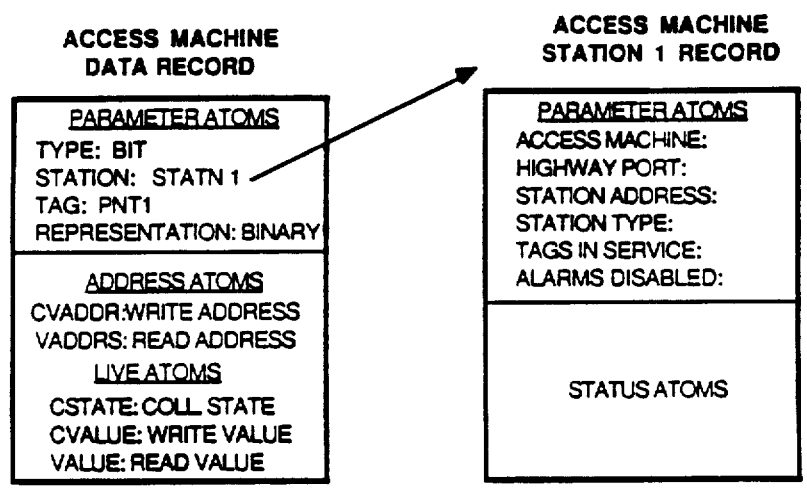
FIG. 3 is a map diagram showing certain records in the database maintained by the access machine of FIG. 1.

As illustrated in FIG. 3, the database 62 contains data records for items of data stored in the memories of the station-level computers. The database also contains a record for the station itself. The records include fields which are also referred to as "atoms". In a data record some of the atoms, referred to as "live" atoms, correspond to data items in the memories of the station-level computers. Other atoms such as parameter atoms and the address atoms provide further information about the data items.

One of the parameter atoms is a tag name such as "PNT 1" which relates to several items in memory of the programmable controller at STATION 1. The tag name is unique within the cell in identifying a data record, and an atom name can be appended to the tag name to provide a unique tag reference identifier for each atom in the database 62.

A record is also provided in the database 62 for each station. Such a record would be identified by station tag such as "STATN 1". This station tag is included as a atom in each data record applicable to the station, to provide a cross-reference to the station record as seen in FIG. 3. The station record includes various parameter and status atoms which are applicable to a plurality of data records. By using a cross-reference such as the station tag, all data records for a station can be related to the station information without repeating the station information in each data record.

The following is a list, in alphabetical order, with short descriptions, of the some of the atoms commonly found in the various types of records which shall be discussed in relation to the access machines:

CSTATE Atom—this atom is a read-only atom which indicates certain status information about a data item, such as whether the data item has been updated the first time, whether the data item is being updated at the desired rate, and whether the data is valid.

CVADDR Atom—this atom represents the remote station table address of the CVALUE (command value) atom.

CVALUE Atom—this atom represents a command value that can be written to a data item.

INSERV Atom—this atom is a bit-oriented, two-state atom that signals whether the data item is operational.

RATE Atom—this atom is a code representing a scan class category for updating the record.

RMTFMT Atom—this atom indicates the numbering system in which the data is represented, such as 3-digit BCD, 16-bit unsigned binary, single-bit binary, ASCII code or one of the representations used for timers and counters in programmable controller 11.

RSTATN Atom—this atom is a tag name of the network station from which data is to be collected. This atom is applicable only to station-level records.

TAG Atom—this is global identifier for the data record.

TYPE Atom—this atom is a description of the type of data identified by the TAG atom. This description may be at the data item level such as the types BIT, TIMER or TEXT, or the description may be at a system level such as STATION, ACCESS MACHINE or CELL CONTROLLING COMPUTER.

VADDRS Atom—this is a station data table address for the VALUE atom.

VALUE Atom—this atom is either a default value or the collected value for a data item.

In the above list the "live" atoms, which may be modified in "real time" in response to changing conditions on the controlled equipment, include the collection state (CSTATE) atom, the write value (CVALUE) atom and the read value (VALUE) atom.

Figure 4:
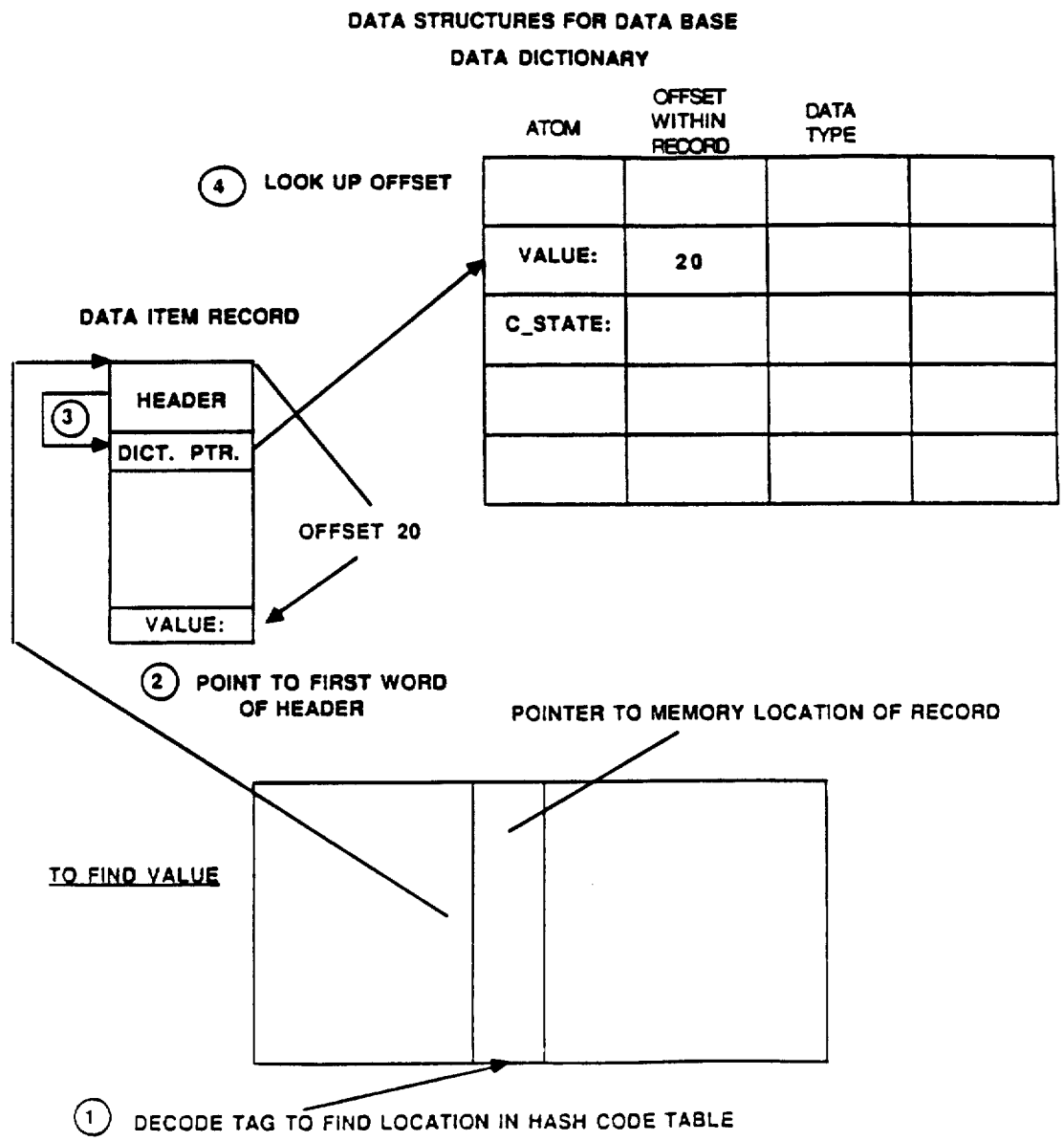
FIG. 4 is a map diagram showing the organization of data items in a database residing in the access machine of FIG. 1.

FIG. 4 illustrates the manner in which the data records and atoms are organized and accessed in the database 62. A mathematical function of the type known in the art as a "hash function" is applied to the tag reference associated with each atom to generate a computed memory address in a hash code table seen in FIG. 4. At this address a pointer or second address is stored and this address is the address of the first data word in the record. The data record has a header with a pointer (in this case a number representing an offset from the first data word) to a data dictionary pointer. A data dictionary is provided for each "type" of record, such as BIT, NUMBER or STATION, and this dictionary is stored in another location in memory and linked through the data dictionary pointers to the numerous records of its specific type. The data dictionary includes a list of the atoms in a particular type of record and their location (by offset from the beginning of the record) within the record. The data dictionary may also include other information about the atom such an atom type. The atom identifiers are used to look up the offsets to atom locations in the data dictionary. The offsets are then used to find the atom values which are stored in the data record.

Hashing allows records to be added to memory in a mathematical though non-contiguous and non-consecutive fashion. It is thus possible to insert a new record in the database 62, and give it the appearance of being related to a consecutive system of station-level addresses, while in fact storing and retrieving the record from a random location in memory.

As mentioned earlier, there are different types of records according to the TYPE atom. For each type of record the database 62 includes a data dictionary. In the following data dictionaries, certain atoms related to an alarm function have been deleted, as that enhancement is not necessary to the basic invention described herein.

Figure 5:
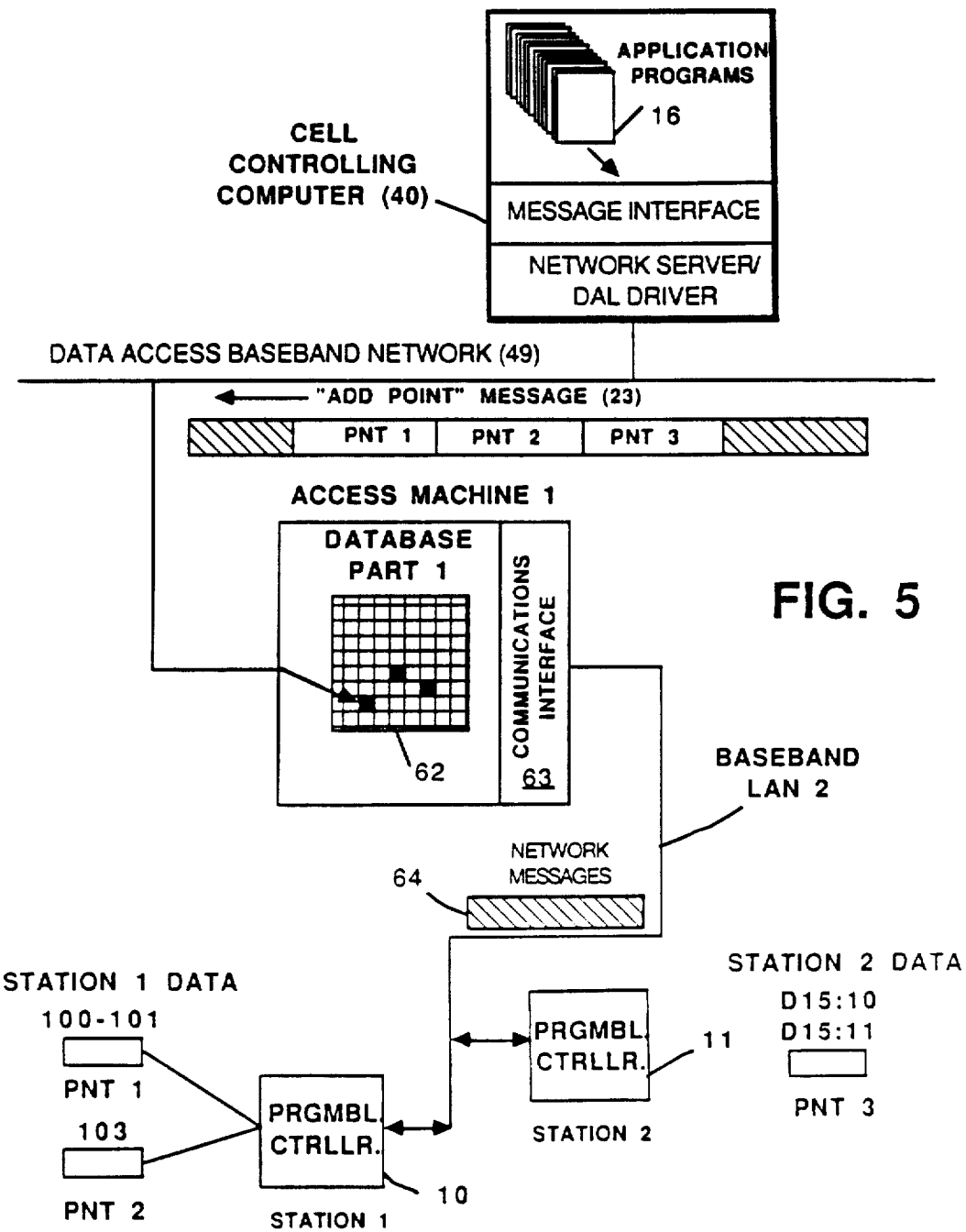
FIG. 5 is a data flow diagram showing the addition of items to database in the access machine of FIG. 1.

The data dictionary for a system-level record such as a CELL CONTROLLING COMPUTER 40 would include the following atoms:
ID—cell controlling computer number
INSERV—in service bit
TAG—tag name
TYPE—type code
VALUE—status code
AM1TAG—first access machine tag
AM1ALD—first access machine auto-load status
AM1FIL—first access machine auto-load file address
AM2TAG—second access machine tag
AM2ALD—second access machine auto-load status
AM2FIL—second access machine auto-load file address The data dictionary for a system-level record such as an ACCESS MACHINE would include the following atoms:
GWLOAD—enable loading of database
ID—access machine number
INSERV—in service bit
RATE 1—scan class 1 in secs.
RATE 2—scan class 2 in secs.
RATE 3—scan class 3 in secs.
RATE 4—scan class 4 in secs.
RATE 5—scan class 5 in secs.
RATE 6—scan class 6 in secs.
TAG—tag name
TYPE—type code
VALUE—status code
DALADR—data access link address The data dictionary for a system-level record such as STATION would include the following atoms:
AMTAG—access machine tag name
ACK—acknowledgements
DIASTA—diagnostics status
HWPORT—network port
INSERV—in service status
RATE—scan class
STADDR—station network address
STYPE—station type
TAG—station tag name
TINSER—station's tag in/out service status
TYPE—type code
VALUE—status code The data dictionary for a data record such of the BIT data type would include the following atoms:
ACK—acknowledgements
CSTATE—collection status
CVADDR—command value address
CVALUE—command value
CVDBNC—command disagree debounce
INSERV—in service status
RATE—scan class
RMTFMT—remote data format
STATN—station tag name
TAG—tag name
TYPE—type code
VADDRS—data table address of VALUE
VALUE—collected value The data dictionary for a data record of the INTEGER data type would include the following atoms:
ACK—acknowledgements
CSTATE—collection status
CVADDR—command or write value address
CVALUE—command or write value
INSERV—in service status
RATE—scan class
RMTFMT—remote data format, including 3-digit, 4-digit and 6-digit BCD and 16-bit signed and unsigned binary
RSTATN—station tag name
TAG—station tag name
TYPE—type code
VADDRS—data table address of VALUE atom
VALUE—collected or read value During startup operations, the database 62 is downloaded from the cell controlling computer 40 to the access machines. To add a data record to the database 62, the user of the cell controlling computer 40 enters the information through the keyboard 46 and views the information on the video monitor 45. When the user is ready to enter a data item record, the user executes a "COMMIT" command, and cell controlling computer 40 responds to this command to generate an "ADD POINT" message on the data access baseband network 49 as seen in FIG. 5.

The "ADD POINT" message is transmitted to ACCESS MACHINE 1, where it is processed first by the data link driver 152 and second by the data management program 154 to add the new data records to the database structure discussed in relation to FIG. 4. ACCESS MACHINE 1 then sends a confirmation message back to the cell controlling computer 40 to signal a successful configuration of new data records in the database 62.

In this example, we shall assume that three data records with tag identifiers PNT 1, and PNT 3 are to be added to the database 62. These records contain the parameter and address atoms shown in Table 1 below.

TABLE 1

| New Data Records ACCESS MACHINE DATABASE POINTS | |
|---|---|
| ATOM | VALUE |
| TAG | PNT1 |
| TYPE | AMT_INTEGER |
| RATE | AMR_NOT_USED |
| RSTATN | STATN1 |
| RMTFMT | AMP_BINARY |
| VADDRS | 100 |
| CVADDRS | 101 |
| TAG | PNT2 |
| TYPE | AMT_INTEGER |
| RATE | AMR_NOT_USED |

TABLE 1-continued

| New Data Records ACCESS MACHINE DATABASE POINTS | |
|---|---|
| ATOM | VALUE |
| RSTATN | STATN1 |
| RMTFMT | AMP_BINARY |
| VADDRS | 103 |
| CVADDRS | 103 |
| TAG | PNT3 |
| TYPE | |
| AMT_INTEGER | |
| RATE | AMR_6_RATE |
| RSTATN | STATN2 |
| RMTFMT | AMP_BINARY |
| VADDRS | D15:10/0 |
| CVADDRS | D15:11/0 |

The three data records have been given tags "PNT1", "PNT2" and "PNT3". As seen in FIG. 5, it shall be assumed that records PNT1 and PNT2 relate to data stored at data word addresses "100" "101" and "103" in a programmable controller 10 at Station 1, while the record PNT3 relates to data stored at data word addresses "D15:10" and "D15:11" in a programmable controller 11 at Station 2. The addressing for the programmable controller 10 at Station 1 conforms to the addressing in the PLC-2 TM Programmable Controller offered by Allen-Bradley Company, Inc., while the addressing for the programmable controller at Station 2 conforms to the addressing in the PLC-3 TM Programmable Controller offered by Allen-Bradley Company, Inc.

PNT 1 and PNT 2 are examples of data that will be updated in the ACCESS MACHINE 1 by "unsolicited messages" from the programmable controller 10 at Station 1. This is controlled by setting the "RATE" atom in Table 1 to "AMR_NOT_USED" for PNT1 and PNT2. PNT 3 is an example of data that will be updated in response to the ACCESS MACHINE "polling" Station 2 with a polling message. The rate of polling or update is controlled by the "RATE" atom which is set to scan class 6 by the designation "AMR_6_RATE" in Table 1.

The information shown in Table 1 will be added to the database 62 through the "ADD POINT" message seen in FIG. 5. All three data records are of the integer data type (AMT_INTEGER) and are in binary format (AMP_BINARY).

After the data records have been added to the database 62, ACCESS MACHINE 1 will begin to update values for three atoms for each data record: VALUE (read value), CVALUE (write value) and CSTATE (collection status). This is done through sending and receiving network messages 64 on BASEBAND LAN 2.

Figure 6:
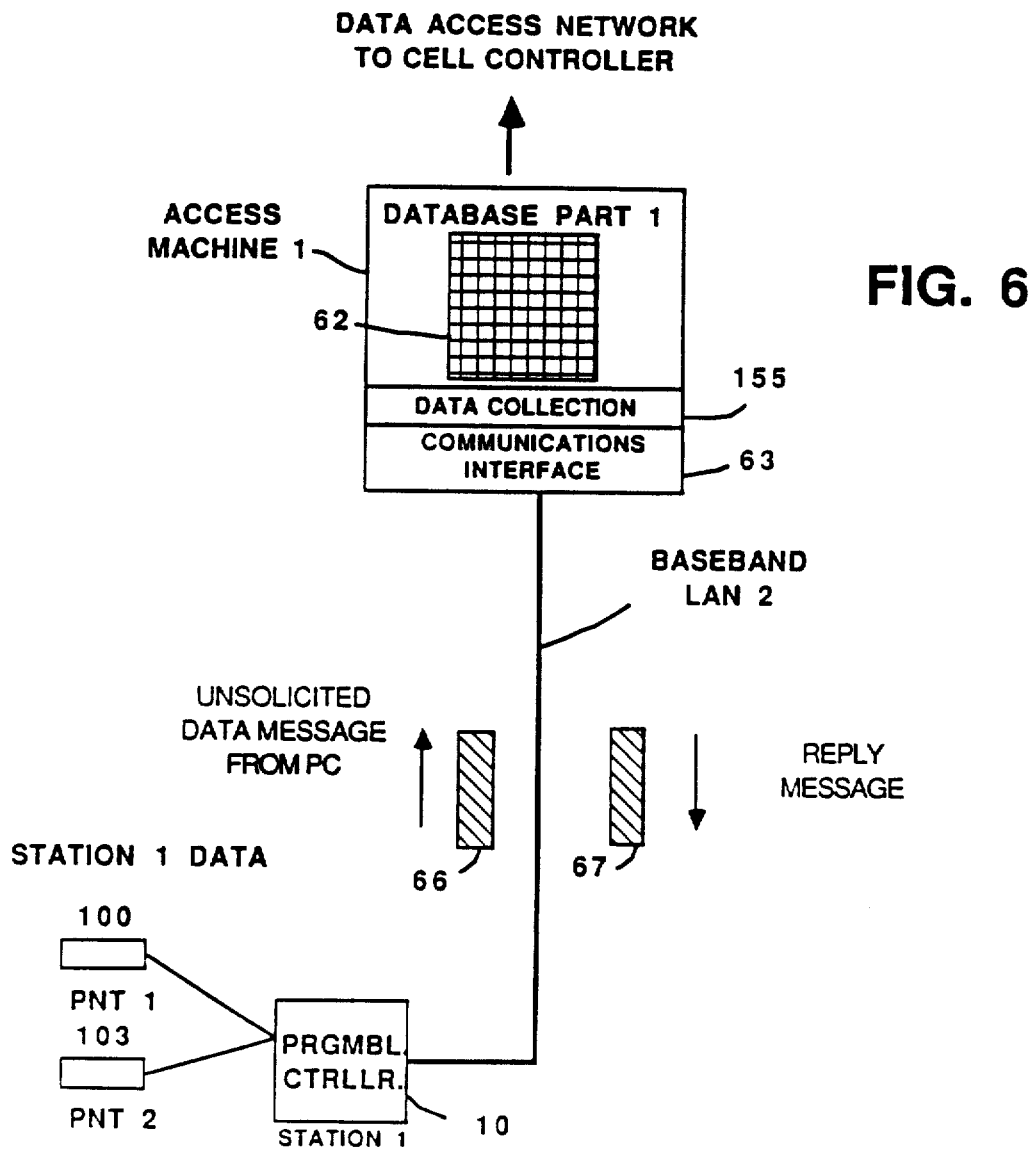
FIG. 6 is a data flow diagram showing message traffic on a local area network connecting an access machine to a station-level device.

Referring to FIG. 6, the communication interface 63, is made up of hardware elements 146-148 and program elements 153, 156, 157 and 149 in FIG. 2. Data sent and received through the communication interface 63 is retrieved and updated in the database 62 by the data collection program process 155. In the prior system, the collection program process generated "polling messages" that were sent to each Station to solicit a return message with updated values for the collectable atoms. In the present invention, Station 1 sends an unsolicited message 66. The message 66 is received through the communication interface 63 by the collection program process 155. Because no previous message has been sent to Station 1, the collection program process 155 is now provided with the ability to interpret the message 66 and properly load data into the database 62 in response to the message.

After the message has been processed, the collection program 155 will direct the communication interface 63 to send a reply message 67, so that Station 1 will know that its unsolicited message has been accepted and successfully processed, or that a communication error has occurred.

Figure 7:
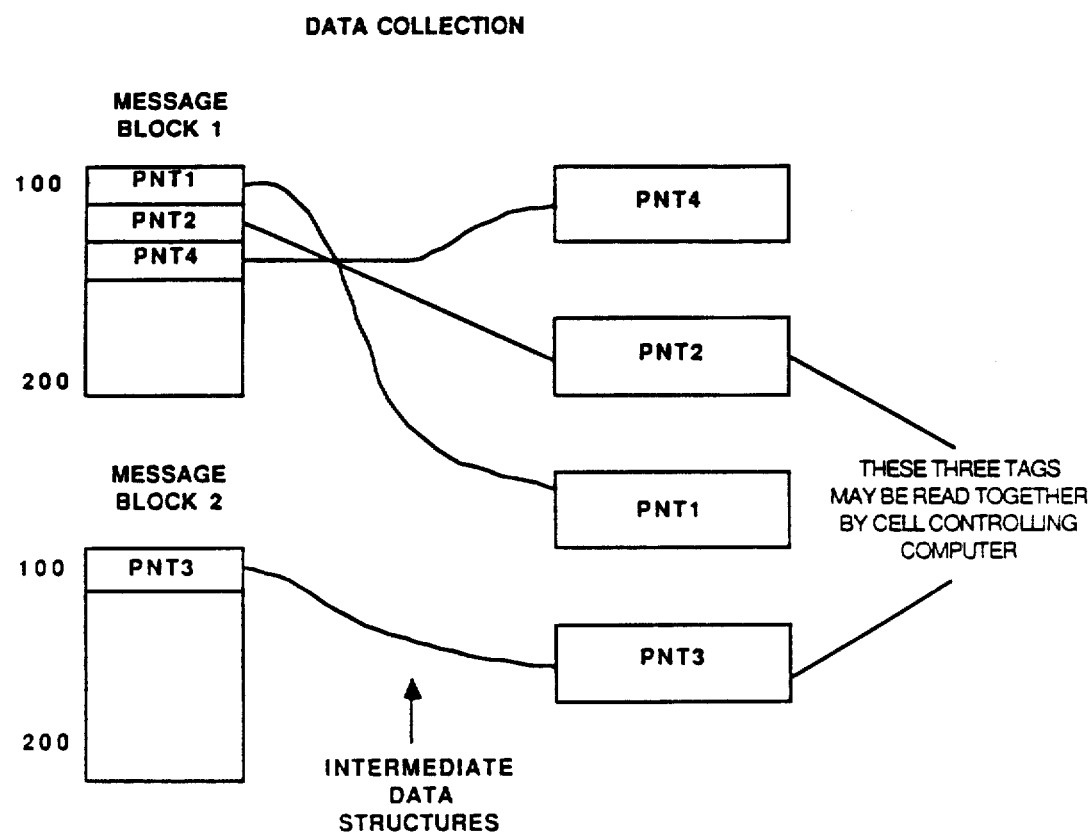
FIG. 7 is a block diagram illustrating data collection in the access machine of FIG. 2.

The data collection process 155 is organized around a number of message block descriptions which are set up in ACCESS MACHINE 1 during startup operations. As shown in FIG. 7, this allows tag-referenced atoms in different message blocks, such as MESSAGE BLOCK 1 and MESSAGE BLOCK 2, to be reorganized in the database 62, and returned to the cell controlling computer 40 in a single database operations message. In this example, atoms related to PNT 1, PNT 2 and PNT3 are collected in messages from different stations, and are then returned to the cell controlling computer 40 in one database operations message. The message block description records and other intermediate data structures are seen in more detail in FIG. 8.

Figure 8:
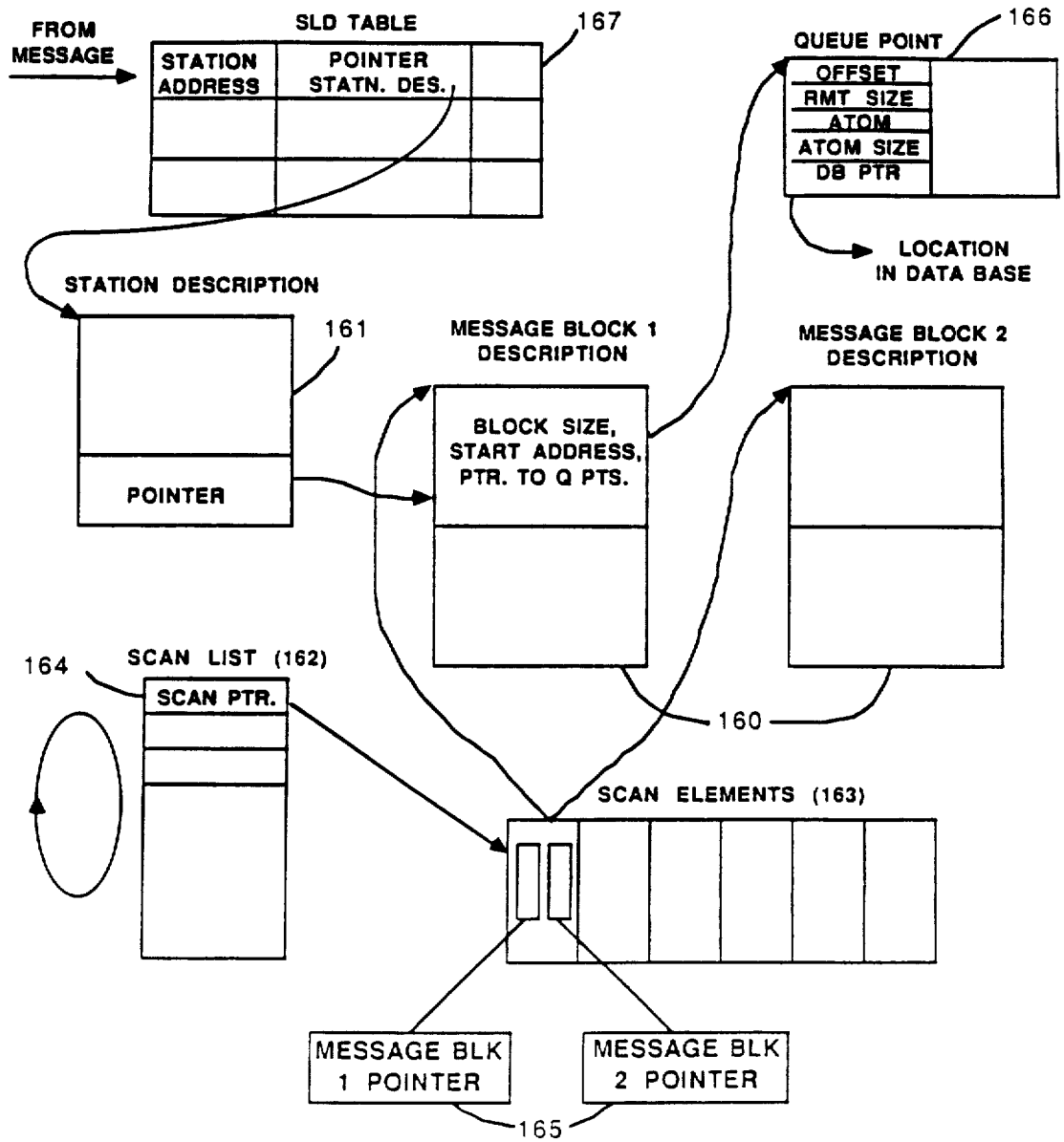
FIG. 8 is a block diagram further illustrating data collection in the access machine of FIG. 2.

Referring then to FIG. 8, the the access machine executes an initialization program process to set up a station level device (SLD) table 166 which contains a list of the station addresses recognized by the communication process 63. In the the SLD table 166 these station addresses are cross-referenced to pointers to corresponding station description blocks 161 The station description blocks 161 are set up from the station records seen in FIG. 3 and downloaded from the cell controlling computer during startup operations.

The access machine also executes an initialization program process to determine which stations are connected to it and how many atoms in the database 62 must be communicated to each respective station. Depending on this number it sets up one or more message block description data structures 160 per station. Each of these data structures 160 defines a block of data to be transmitted to or from the station over the station networks (in this case BASEBAND LAN 2). Each message block description data structure 160 includes reference data specifying the block size, a starting address in memory and pointers from the atoms in the message block to "queue points" 166.

For example, it shall be assumed the message block descriptions 160 in FIG. 8 relate to data from Station 1 and Station 2, respectively, and that there are two more message block descriptions for Station 1. Each message block description 160 is cross-referenced to a station description block 161.

The message block descriptions 160 are used to size blocks of data according to the capabilities of the BASEBAND LAN's. In the "polling" mode, these networks can communicate a number of request messages to the stations per second, and can receive a smaller number of data reply messages per second. In order to maximize the data communication rate from the stations and to minimize scan times for updating data, two further data structures, referred to as a SCAN LIST 162 and SCAN ELEMENTS 163 are used.

The SCAN LIST 162 contains a list of SCAN POINTERS 164 based on the scan class or "RATE" assigned to the atoms in a particular message block description. The scan class may specify, for example, that the message block of data should be collected once every two seconds and that ACCESS MACHINE 1 can receive two messages in that time period. In that event, a SCAN POINTER 164 will point to a SCAN ELEMENT 163 having pointers to the two message blocks 160. When the CPU in ACCESS MACHINE 1 reaches the SCAN POINTER 164 and is referred to the SCAN ELEMENT 163, it will cause transmission, in one message time frame, of message requests to Stations 1 and 2 to request message block A and message block B as reply messages. These reply messages will be transmitted to ACCESS MACHINE in two later message times frames, but within the time limit necessary to meet the scan class update time.

By transmitting a number of requests in one message time frame to different stations, the stations are allowed to work simultaneously in preparing return messages. This provides a faster communication for messages and data than would be the case if only one message request could be transmitted in each message time frame.

As stated earlier in this description, when a data item is subject to unsolicited collection of data, the "RATE" atom in the data record received from the cell controlling computer 40 indicates that there is no scan class. In this case the reference to the message block descriptions is provided by the SLD table 167 and not through the scan list 162 and scan elements 163.

The links between the message block descriptions and the atom locations in the database 62 are the queue points 166. Each queue point 166 includes a pointer to the location in the database 62 that stores the value of the particular atom. Other information in the queue point includes an offset pointer to the database pointer, the size of the atom at the remote station (RMT SIZE), the name of the atom (ATOM) and the size of the atom in the database 62 (ATOM SIZE). The queue points are set up when the database 62 is downloaded and when new data items are added to the database 62 through the "ADD POINT" message.

Figure 9:
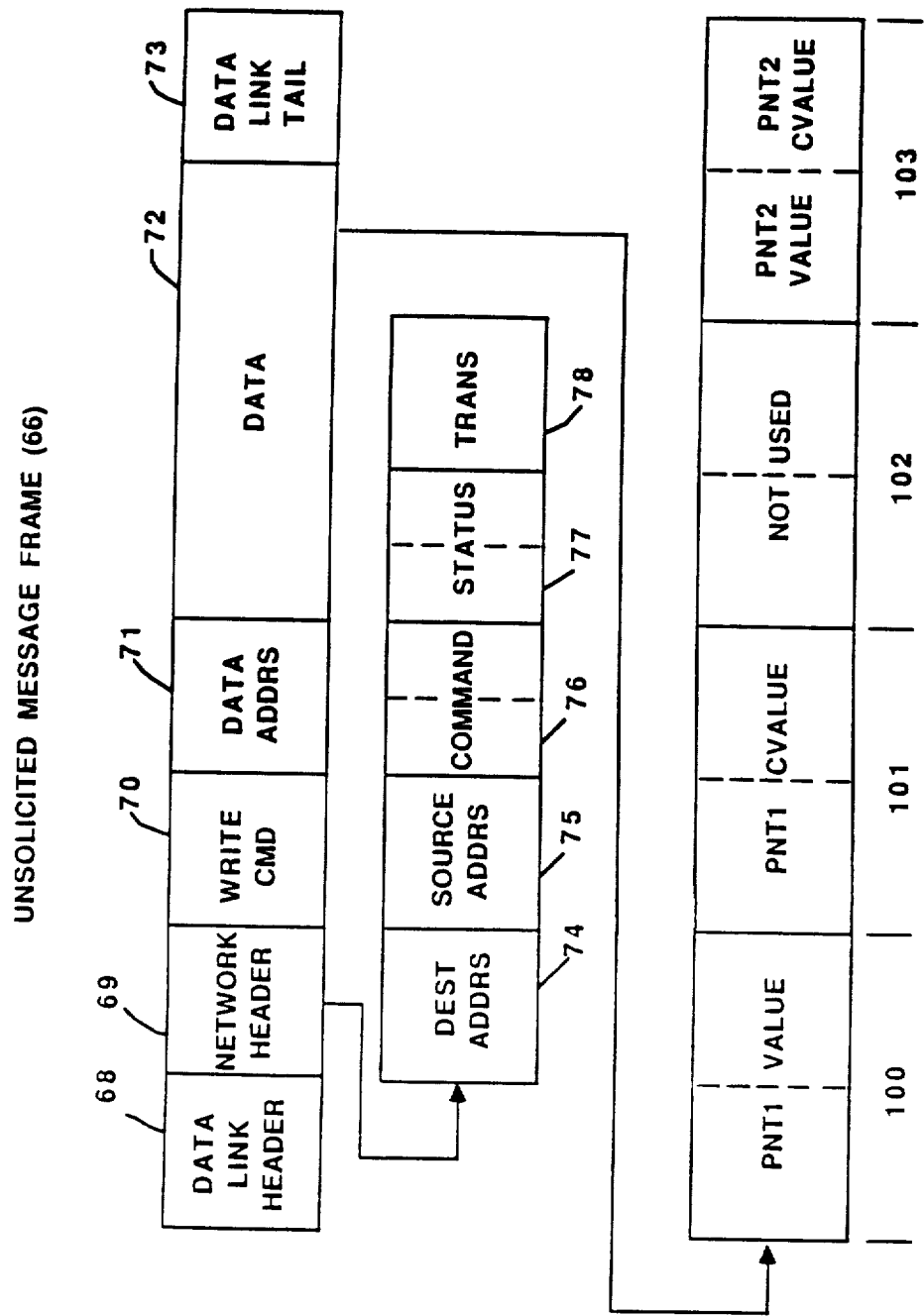
FIG. 9 is a map diagram of the unsolicited message of FIG. 6.

A message frame for an unsolicited messages 66 of FIG. 6 is mapped in FIG. 9. It is helpful here to understand that communication is being controlled at four levels, which in ascending order are as follows:

1. Physical Link Layer
2. Data Link Layer
3. Network Layer
4. Application Layer.

The bottom three layers correspond to the bottom three layers in various well known communication models such as the Open Systems Interconnection (OSI) model. The application layer is at a higher level, Level 7, in the OSI model, however, the present system does not include the intermediate layers 4, 5 and 6 of the OSI model, so the application layer is at level 4 in this example.

An unsolicited message includes a data link protocol header 68 and a data link protocol tail 73 which are added and stripped from messages by the electronic circuitry controlling the network. These protocol items are described in detail in Allen-Bradley Publication 1771-6.5.15 (1985). The unsolicited message 66 frame might also be considered to include certain additional signals used at the lowest level by the physical network and these are known in the art.

The station network interface module for the Data Highway TM Network generates a network header 69 for each message. This includes a network destination address 74 for the access machine, a network source address 75 for the station, a command code 76, a status code 77 and a transaction code 78 as described in Allen-Bradley Publication 1771-6.5.15 (1985).

The remaining fields in the frame are added by execution of application software in a manner known in the art for the PLC-2 TM Programmable Controller. Execution of a "write" instruction in the user application program at the station will generate a "WRITE" command 70, a two-byte starting address 71 for the data at the Station 1 (100 in this example) and will cause the data 72 to be loaded into the message. Execution of a "write" instruction in the user application program at the station will also generate a portion of the command code 76 and a portion of the status code 77. These codes are provided partly by the network layer and partly by the application layer as signified by the vertical dashed lines in elements 76 and 77.

The data field 72 may range up to 242 bytes, but in this example only eight (8) bytes are present and these are shown in the data detail portion of FIG. 9. As shown there, the bytes are paired in two-byte words with word address 100–103 corresponding to the memory locations in the programmable controller 10. Word "101" holds the VALUE atom for PNT1. Word "102" holds the CVALUE atom for PNT 1. Word "102" is not used, and is ignored when the message is processed by ACCESS MACHINE 1. Word "103" holds a byte-sized VALUE atom for PNT2 and a byte-sized CVALUE atom for PNT2.

When an unsolicited message is received at the communication interface 63, the network driver must compute the size of the message and the size of the data field since this field is not normally generated by the PLC-2 TM Programmable Controller. The communication interface 63 strips the headers 68 and 69 and the protocol tail 73 from the message and then transfers the remaining information to to the data collection program 155 along with the size of the data field.

Referring again to FIG. 8, the data collection program process 155 executes processor instructions to detect the data address 71 and to use it as a pointer to a particular message block description record 160. The data address serves as a reference for all four words "100"–"103" which are related to one message block description record 160. An initial pointer can be incremented to point to the other words in the message. The message block description record 160 contains pointers to the queue points 165 for the individual atoms in data field 72. The queue points 166 in turn contains pointers to the locations in the database 62 where the updated atom values are stored for access by the cell controller 40. The data collection process 155 includes processor instructions which fetch the pointers to the queue points 166 and obtain the pointers to the actual database locations.

Once the pointers to the database locations are obtained by executing the data collection process 155, further instructions are executed to load the updated values into the atom locations in the database 62. The updated values are then accessible by the cell controlling computer 40 using database operations messages.

Figure 10:
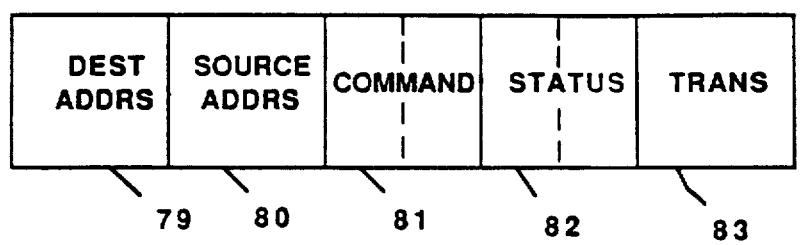
FIG. 10 is a map diagram of a reply message of FIG. 6.

In response to the unsolicited message, the access machine generates a reply message 67 which is seen in more detail in FIG. 10. The reply message is generated at the network level and contains fields 79–83 similar to the network header 69 in FIG. 9. The information in the status field 82 is returned to the station that sent the unsolicited message to confirm a successful communication or to signal a communication error.

Messages from the programmable controller 11 at Station 2 contain updated values for PNT3 and a logical type of data address 71 of the type used in PLC-3 TM Programmable Controllers. This data is obtained by a polling message and reply and is therefore linked through the scan list 164 and scan elements 163 to a different message block description record 160 in FIG. 8. The communication interface 63 detects slight differences in protocols used by various types of programmable controllers, as for example, the different addressing convention used by the PLC-2 TM and PLC-3 TM Programmable Controllers.

From the above description it should now be understood how the access machine executes both polling and unsolicited message communication with the station-level computers.

This description has been by way of an example of how the invention can be carried out. Those of experience in the art will recognize that various details may be modified in arriving at other detailed embodiments, and that many of these embodiments will come within the scope of the invention. Therefore to apprise the public of the scope of the invention and the embodiments covered by the invention the following claims are made.

I claim:

1. A database cache computer for receiving at least a portion of data base downloaded over a first-tier communication link from a higher-level computer and for connection to a plurality of station-level computers located at a corresponding plurality of stations, the plurality of station-level computers including at least one station-level computer controlling an industrial machine in real time, the database cache computer comprising:

means for receiving from the higher-level computer and storing at least a portion of a database including data items which are accessed by the higher-level computer on a basis that is independent of addresses which are assigned to data items at the stations for reference by respective station-level computers;

means for communicating the data item through a second-tier communication link to and form the station-level computers via messages in which the data items are related to addresses which are assigned to the data items at the stations for reference by respective station-level computers;

means interfacing the means for storing to the second-tier communication link for re-organizing the data items from the addresses assigned at the stations to enable access by the higher-level computer on a basis that is independent of the addresses assigned at the stations; and wherein an improvement comprises means received from the higher-level computer for selecting data items for unsolicited update;

wherein the means for re-organizing the data items is configuration, in response to the means for selecting data items for unsolicited update, to include means for recognizing an unsolicited update message initiated from a respective station-level computer without sending a polling message to the station-level computer; and wherein the means for re-organizing the data items is configured, in response to means for selecting data items for unsolicited updated, to include means for extracting updated values from an unsolicited update message and loading such updated values into their respective locations in the database for access by the higher-level computer on a basis that is independent of the addresses assigned at the stations.

2. The data cache computer of claim 1, further comprising:
   means received from the higher-level computer for selecting data items for polling update; and
   wherein the means for re-organizing the data items is configured, in response to means for selecting data items for polling update, to include means for periodically generating a polling message, means for receiving a reply message, and means for extracting updated values from the reply message and loading the updated values into their respective locations in the database.

3. A method for collecting and monitoring data in a computer system of a type having a higher-level computer, having a data base cache computer, having a first-tier communication link from the higher-level computer to the database cache computer, having a plurality of station-level computers located at a corresponding plurality of stations, the plurality of station-level computers including at least one station-level computer controlling an industrial machine in real time, and having a second-tier communication link from the database cache computer to the station-level computers, the method comprising:
   receiving at the database cache computer a data record from the higher-level computer, wherein the data record includes at least one data item with data designating the data item for update through unsolicited update messages from at least one station-level computer which is remote from the database cache computer and which communicates with the database cache computer over the second-tier communication link;
   in response to the data designating the data item for unsolicited update, configuring the database cache computer to receive an unsolicited data message initiated from a respective station-level computer without a polling message to the station-level computer;
   in response to the data designating the data item for unsolicited update, configuring the database cache computer to extract an updated value from the data message and loading the updated value into a location in the database for receiving updated values for a particular data item originating at the respective station-level computer; and
   the higher-level computer accessing the updated value in the database on a basis that is independent of address of the station and address of the data item at the station.

4. The method of claim 3, further comprising the step of receiving at the data base cache computer a list of data items from the higher-level computer that are designated for update through unsolicited update messages from the station-level computers and the step of configuring the database cache computer to extract updated values for the list of data items from one or more unsolicited messages.

5. The method of claim 3, further comprising the step of receiving a second data record at the data base cache computer, wherein the second data record includes at least one data item designated for polling update, the step of generating a polling message, and the step of receiving, extracting and loading into the database an updated value received in a reply to the polling message.

* * * * *

UNITED STATES PATENT AND TRADEMARK OFFICE
CERTIFICATE OF CORRECTION

PATENT NO. : 4,855,906

DATED : August 8, 1989

INVENTOR(S) : Thomas J. Burke

It is certified that error appears in the above-identified patent and that said Letters Patent is hereby corrected as shown below:

Col. 7, line 1     "a" should be --an--.

Col. 7, line 11    Before "some", delete "the".

Col. 8, line 32    "AMIFIL" should be --AM1FIL--.

Col. 8, line 34    "AMIFIL" should be --AM1FIL--.

Col. 9, line 52    Insert --PNT2-- after "PNT1".

Col. 10, table     "AMT INTEGER" should be under "Value" and opposite "TYPE".

Col. 11, line 25 Delete the second appearance of "the".

Col. 11, line 29 Delete the second appearance of "the".

Col. 12, line 39 "messages 66" should be --message 66--.

Col. 13, line 36 Delete the second appearance of "to".

Col. 13, line 48 "contains" should be --contain--.

Col. 14, line 27 "data base" should be --database--.

Col. 14, line 37 Insert -the-- after "of".

Col. 14, line 38 Insert --the-- before "data".

UNITED STATES PATENT AND TRADEMARK OFFICE
CERTIFICATE OF CORRECTION

PATENT NO. : 4,855,906

DATED : Aug. 8, 1989

INVENTOR(S) : Thomas J. Burke

It is certified that error appears in the above-identified patent and that said Letters Patent is hereby corrected as shown below:

Col. 14, line 42 "item" should be --items--.

Col. 14, line 43 "forms" should be --from--.

Col. 14, line 58 "configuration" should be --configured--.

Col. 14, line 66 "updated" should be --update--.

Col. 16, line 18 Insert --the-- before "address", in both appearances.

Signed and Sealed this

Eighteenth Day of June, 1991

Attest:

*Attesting Officer*

HARRY F. MANBECK, JR.

*Commissioner of Patents and Trademarks*